United States Patent [19]
Husmann

[11] Patent Number: 5,833,216
[45] Date of Patent: Nov. 10, 1998

[54] ROTATING OSCILLATION DAMPER FOR ELEVATOR DRIVE PULLEY

[75] Inventor: Joseph Husmann, Lucerne, Switzerland

[73] Assignee: Inventio AG, Hergiswil NW, Switzerland

[21] Appl. No.: 733,206

[22] Filed: Oct. 17, 1996

[30] Foreign Application Priority Data

Oct. 17, 1995 [CH] Switzerland .......................... 02936/95

[51] Int. Cl.⁶ ........................................ B66D 1/48
[52] U.S. Cl. ........................ 254/266; 187/343; 187/405
[58] Field of Search .................. 254/266, 901; 242/907; 187/292, 343, 344, 405

[56] References Cited

U.S. PATENT DOCUMENTS

| | | | |
|---|---|---|---|
| 2,057,435 | 10/1936 | Kimble | 254/266 X |
| 2,093,946 | 9/1937 | Wood | 254/266 |
| 2,212,798 | 8/1940 | Sole | 254/266 X |
| 2,246,232 | 6/1941 | Almen | |
| 3,512,022 | 5/1970 | Gilbert | |
| 4,370,900 | 2/1983 | Hartz | 74/574 |
| 4,784,372 | 11/1988 | de Jong | |
| 5,439,085 | 8/1995 | Woessner | 188/299 |

FOREIGN PATENT DOCUMENTS

| | | | |
|---|---|---|---|
| 1802226 | 5/1970 | Germany | |
| 3532624 | 4/1986 | Germany | |
| 3327636 | 3/1995 | Germany | |
| 431294 | 8/1967 | Switzerland | 254/266 |

*Primary Examiner*—Donald P. Walsh
*Assistant Examiner*—Emmanuel M. Marcelo
*Attorney, Agent, or Firm*—William J. Clemens

[57] ABSTRACT

An oscillation damper is mounted on an end face of a free end of a drive shaft which drives an elevator drive pulley and is driven by a drive unit gear. The oscillation damper includes a mass which is connected to the drive shaft by a spring such that when the oscillation damper is excited at the natural frequency of the damper, it oscillates in opposite phase and endeavors to compensate for the exciting force.

17 Claims, 4 Drawing Sheets

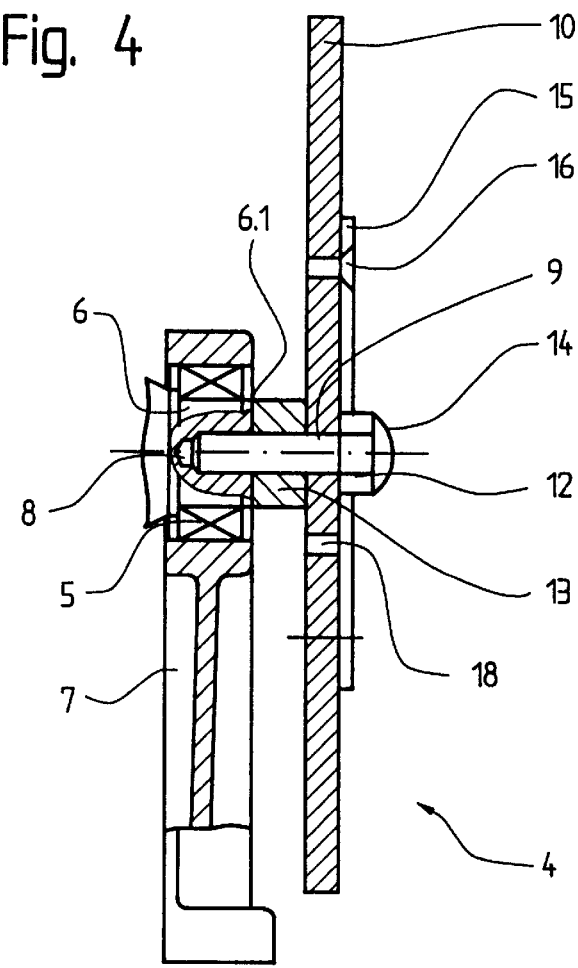
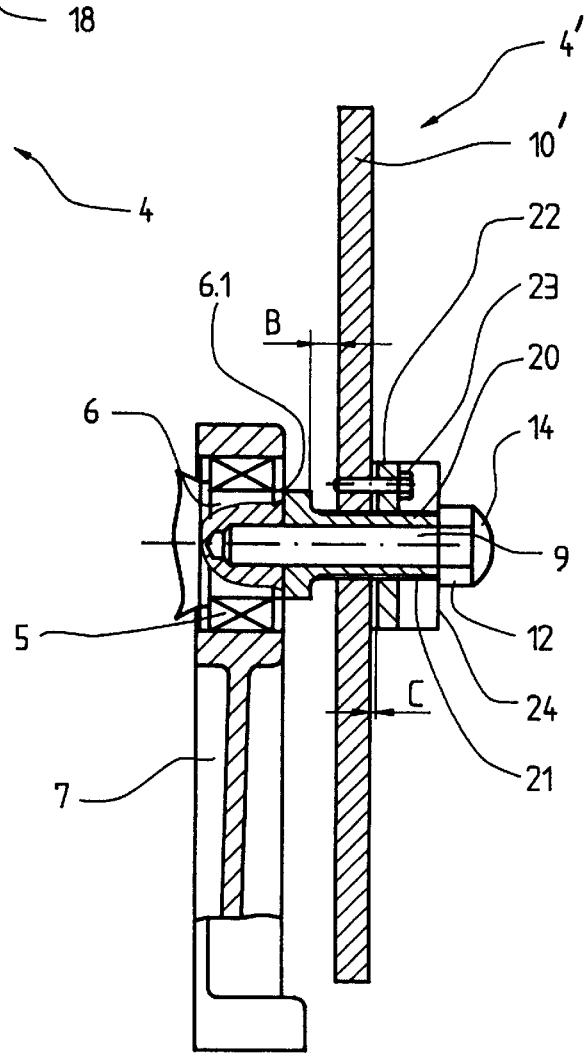

ROTATING OSCILLATION DAMPER FOR ELEVATOR DRIVE PULLEY

BACKGROUND OF THE INVENTION

The present invention relates generally to elevator drive pulleys and, in particular, to an oscillation damper for an elevator drive pulley.

A drive pulley having an external rim supported on a bearing arranged at a hub of a drive shaft for the avoidance of oscillations is shown in the German patent specification DE 35 32 624 (U.S. Pat. No. 4,784,372). Freely supporting support arms with rubber elements, which are received by a housing of the outer rim, are arranged at a flange arranged firmly at the hub. The outer rim, the annular rubber elements and the freely supporting support arms form an arrangement which is rotatably supported at the bearing. A turning moment acting at the outer rim is transmitted by way of the rubber elements, the freely supporting support arms and the flange to the hub and then to the drive shaft. The bearing of the outer rim enables a slight tangential movement of the drive pulley. The inertia of the drive pulley can be varied by increasing or reducing the mass of the outer rim.

A disadvantage of the above described equipment is that rubber elements are used for the avoidance of oscillations. The spring properties of the rubber elements change due to ageing and fatigue which thus changes the damping behavior of the drive pulley. Expensive replacement of the rubber elements and new adjustment of the drive pulley are disadvantageous consequences thereof.

SUMMARY OF THE INVENTION

The present invention concerns an oscillation damper for an elevator drive pulley which oscillation damper is a mass which is rotatable about its axis of rotation by spring elements. The oscillation damper includes a disk for mounting coaxially with a drive shaft on which the elevator drive pulley is mounted. The disk has a predetermined mass and is connected to and concentric with a torsion spring. The disk is mounted with the torsion spring on the end face of the free end of the drive shaft by a threaded bolt extending through a central aperture in the disk and threadably engaging an aperture formed in the end face of the drive shaft. A nut threadably engages the threaded bolt for retaining the disk on the threaded bolt and a cap covers the nut.

It is an object of the present invention to remedy disadvantages of the known equipment by providing a damping behavior which is easily settable and does not change over the course of time.

It is another object of the present invention to permit assembly of the drive pulley on the drive shaft independently of the damping equipment.

It is a further object of the present invention to permit oscillation damping for drive pulleys already in operation can be subsequently equipped with the damping equipment according to the invention and adjusted to specific damping properties.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4 is a cross sectional view of the oscillation damper shown in the FIG. 1 with a spoke-shaped torsion spring;

FIG. 6 is a cross sectional view of an alternate embodiment oscillation damper with a tubular torsion spring according to the present invention;

DESCRIPTION OF THE PREFERRED EMBODIMENT

Oscillations generated by an elevator geared drive gear unit often lead to disturbing noises in the elevator car. The frequency of the tooth engagement in the case of two-start and three-start worm gears is particularly disturbing. The disturbing noise is in the frequency range of about 50 hertz to 75 hertz. An oscillation damper operating on the drive unit can consist of a mass and a spring with the natural frequency $f_r = 1/(2\pi) \cdot (c/m)^{1/2}$, wherein "c" (Newtons per meter) is the spring rate and "m" (kilograms) is the mass of the oscillation damper. One end of the spring is connected with the mass. When the other end, denoted as a foot point, is excited at the natural frequency, the damper oscillates in opposite phase and endeavors to keep the foot point quiet. The force in the spring then compensates for the exciting force. With increasing mass, the width of the frequency band increases with reduced amplitude. As rule of thumb, the damper mass should be about ten percent of the mass to be kept quiet. In the case of geared elevators, a rotating oscillation damper is used which has about the same diameter as the drive pulley and is connected to the drive shaft by a torsion spring.

Figure 1:
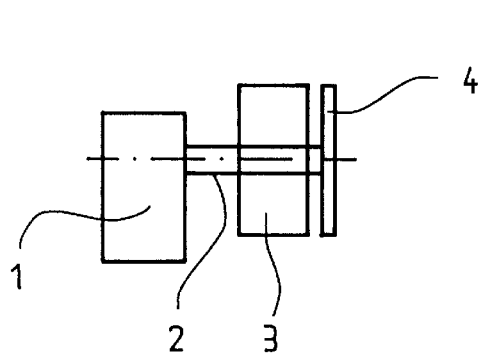
FIG. 1 is a schematic view of an elevator drive unit including a gear coupled to a drive shaft, a drive pulley mounted on the drive shaft, and an oscillation damper mounted on a free end of the drive shaft in accordance with the present invention.
Figure 2:
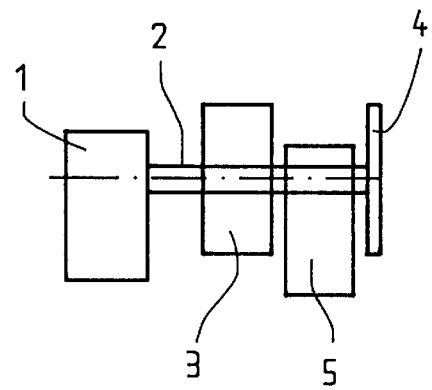
FIG. 2 is schematic view of the drive unit shown in the FIG. 1 with an external bearing supporting the drive shaft.

There is shown in the FIG. 1 a gear 1 of a elevator drive unit, for example a worm wheel gear, connected to a drive shaft 2. The drive shaft 2 has a free shaft end at which a drive pulley 3 and an oscillation damper 4 are mounted. An alternate embodiment of the drive unit is shown in the FIG. 2 wherein the free end of the drive shaft 2 can be supported by an external bearing 5 located between the drive pulley 3 and the oscillation damper 4.

The portion of the drive shaft 2 between the drive pulley 3 and the oscillation damper 4 acts as a spring, which must also be taken into consideration as part of the damper spring in the computation of the oscillation damper requirements. Regarded mathematically, the drive shaft 2 terminates in every case at the drive pulley 3, wherein the oscillation damper 4 is arranged coaxially with the drive shaft at the free end thereof.

Figure 2A:
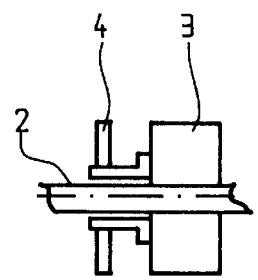
FIG. 2a is a schematic view of an alternate embodiment of the drive unit shown in the FIG. 1 with an oscillation damper mounted on the drive pulley at the gear-side end face of the drive pulley.

As shown in the FIG. 2a, the oscillation damper 4 also can be mounted coaxially with the drive shaft 2 adjacent to the gear-side of the drive pulley 3 facing the gear 1 (not shown)

in another alternate embodiment. Alternatively, the oscillation damper 4 can be mounted coaxially with the drive shaft 2 adjacent to the side of the drive pulley 3 facing the free end of the drive shaft.

Figure 3:
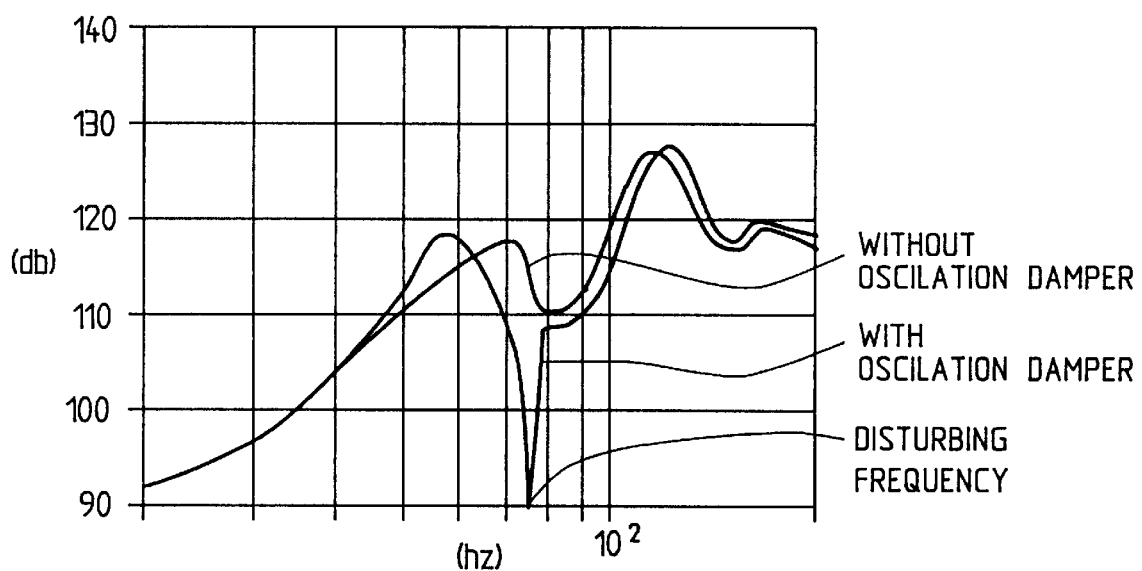
FIG. 3 is a graph of the frequency response of the rotating drive pulley shown in the FIGS. 1, 2 and 2a with and without the oscillation damper.

There is shown in the FIG. 3 a plot of frequency response (amplification or amplitude gain in db versus frequency) of the tangential acceleration at the drive pulley 3 with and without the oscillation damper 4. The amplitude or gain in db is the ordinate and the oscillation frequency in hertz is the abscissa of the graph. The rolling defect in the gear toothing acts as excitation. The oscillation damper 4 causes a strong lowering of the amplitude at, for example, the disturbing frequency of 73.5 hertz.

Figure 5:
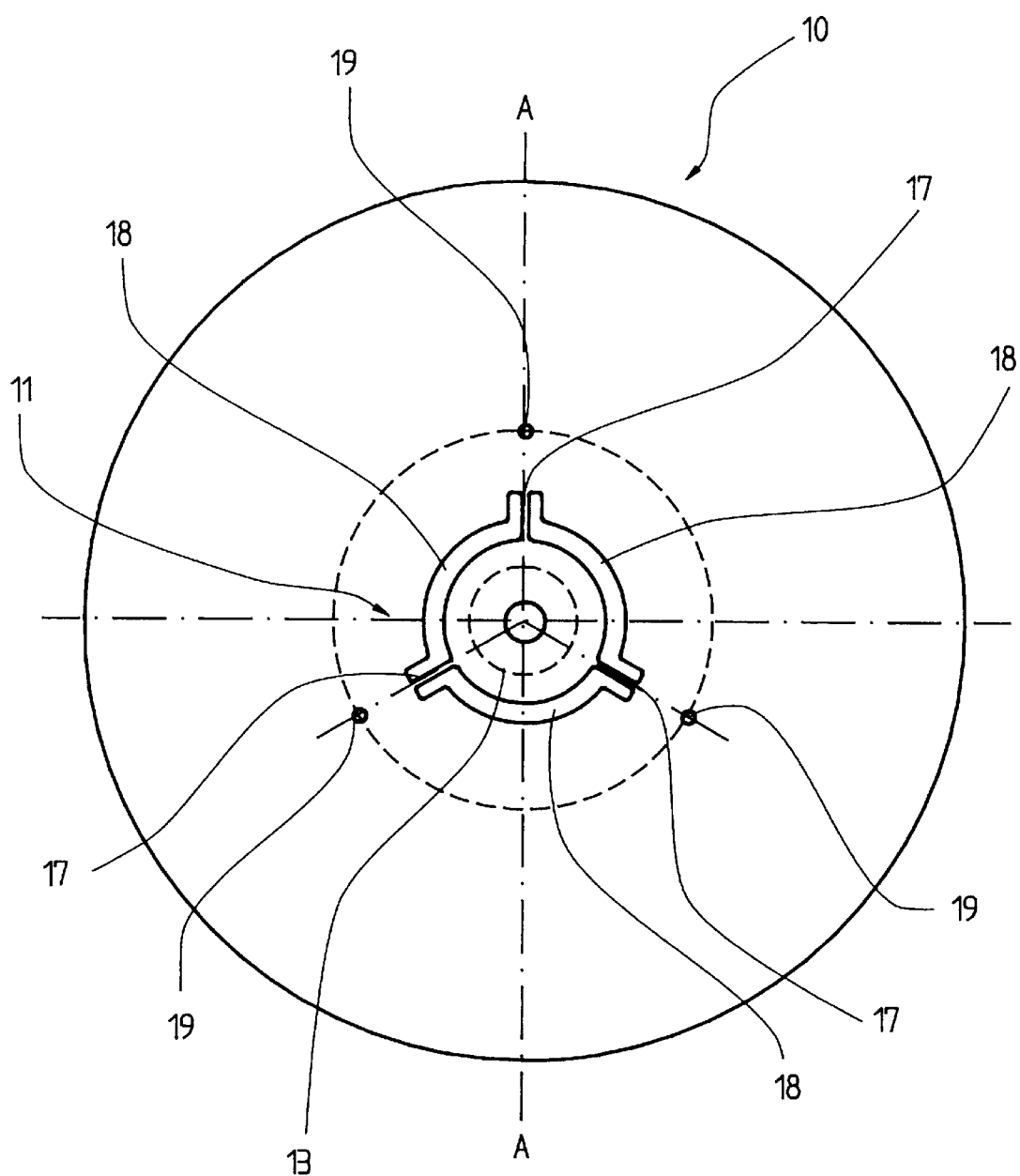
FIG. 5 is a front elevation view of the oscillation damper shown in the FIG. 4.

One embodiment of the rotating oscillation damper 4 having a spoke-shaped torsion spring 11 according to the present invention is shown in the FIGS. 4 and 5. The FIG.4 is a sectional view taken along the line A—A in the FIG. 5. A free end 6 of the drive shaft 2 is supported by the external bearing 5 which is retained by a bearing block 7. The shaft end 6 has an axially extending bore 8 formed in an end face 6.1 thereof, into which bore an inner end of a threaded bolt 9 is screwed. The bore 8 is typically formed during the manufacture of the drive shaft 2 independently of whether the drive unit is equipped with the oscillation damper 4 or not. The threaded bolt 9 extends through a central aperture in a disk 10, which disk acts as a mass. The spoke-shaped torsion spring 11, which is machined out of a central portion of the disk 10, enables a slight movement of the disk about the longitudinal axis of the threaded bolt 9. The spring hardness is co-determinative of the natural frequency of the oscillation damper 4. The disk 10 is retained between a first nut 12 threaded onto an outer end of the bolt 9 and a spacer member 13. The nut 12 presses the disk 10 and the spacer member 13 against the end face 6.1 of the shaft free end 6. A cap 14 covers the first nut 12 in order to prevent persons and objects from being seized by the rotating first nut. For fine adjustment, an additional mass in the form of a trimming ring 15 is attached to the disk 10 by a plurality of first screws 16.

As shown in the FIG. 5, the spoke-shaped torsion spring 11 has a plurality of spokes 17, which spokes are defined by slots or recesses 18 formed in and extending through the disk 10. Each recess 18 extends, for example, circularly over a predetermined arc of almost 120° and has a radially outwardly extending prolongation formed at each end thereof. The portion of the disk 10 remaining between two adjacent prolongations forms one of the spokes 17 with its spring effect. The first screws 16 extend through apertures in the trimming ring 15 and engage threaded apertures 19 formed in the disk 10 spaced radially outwardly from the spokes 17.

The FIG. 6 shows an alternate embodiment of the present invention as a rotating oscillation damper 4', in which the oscillation frequency, also called the damping frequency, is settable to, for example, between 46 hertz and 90 hertz. The first nut 12 urges a tubular torsion spring 20 against the end face 6.1 of the shaft free end 6. The torsion spring 20 is coaxially mounted on the bolt 9 and enables a slight movement of a disk 10' about the longitudinal axis of the bolt. A thread, which is not illustrated, formed in the central aperture of the disk 10' engages an external thread 21 formed on the tubular torsion spring 20, whereby the disk is adjustable axially to a specific spacing B from the end face 6.1 according to the desired oscillation frequency. The oscillation frequency reduces as the spacing B increases. For securing the disk 10', a second or clamping nut 22 is mounted on the tubular torsion spring 20 so that an air gap C of, for example, 2 to 3 millimeters, between the disk and the nut is present. The disk 10' and the clamping nut 22 are coupled together by a plurality of second screws 23 which extend through apertures in the nut and threadably engage apertures in the disk to clamp the disk on the torsion spring 20. A hood 24 covers the clamping nut 22 to prevent persons and objects from being seized by the rotating clamping nut 22 and second screws 23. In this alternate embodiment, the low production costs and the simple and accurate setting of the damping frequency are advantages.

Figure 7:
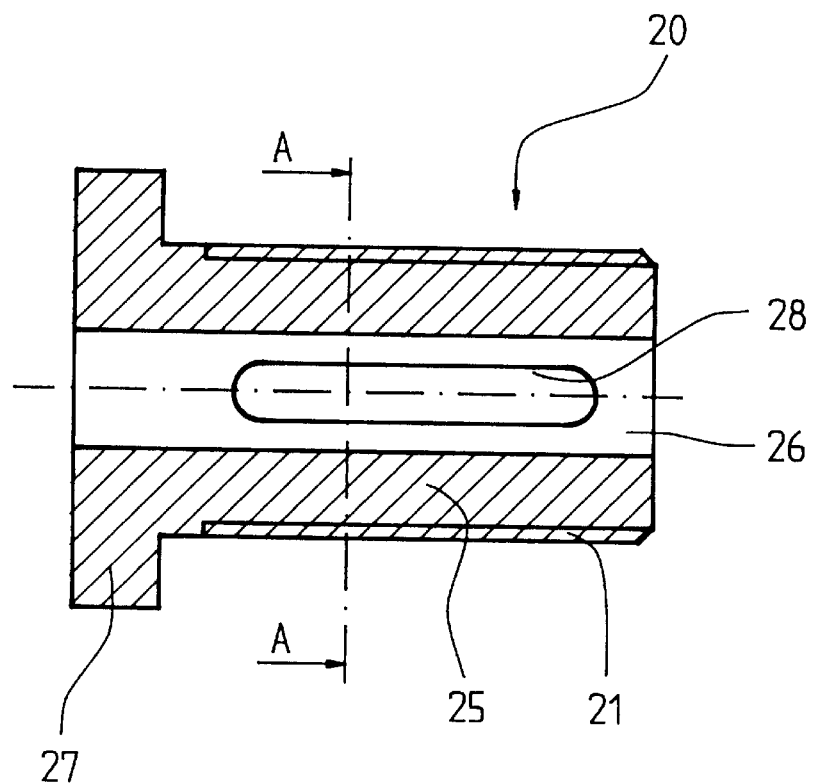
FIG. 7 is an enlarged cross sectional view of the torsion spring shown in the FIG. 6.
Figure 8:
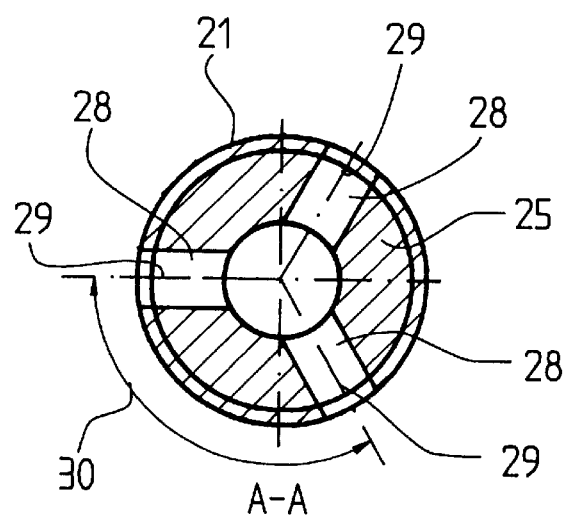
FIG. 8 is a cross sectional view of the torsion spring taken along the line A—A in the FIG. 7.

There is shown in the FIGS. 7 and 8 the torsion spring 20 in more detail. The torsion spring 20 includes a tubular spring element 25 with the external thread 21 formed thereon and a longitudinal bore 26 formed therethrough. A spring foot 27 is formed as a radially extending flange, which foot is urged against the end face 6.1 of the shaft free end 6 by the nut 12 and the threaded bolt 9. At least one longitudinal slot 28 is formed in the spring element 25 and extends radially through the wall thereof. As shown in the FIG. 8, three of the longitudinal slots 28 are spaced on the spring element 25 such that radial axes 29 form an angle 30 of 120°. The longitudinal slots 28 can, for example, also be arranged in a spiral shape on the spring element 25. The longitudinal slots 28 reduce the torsional stiffness of the torsion spring 20 and increase the range of adjustment of the damper frequency.

In summary, the oscillation damper 4,4' for the elevator drive pulley 3 includes the disk means 10,10' for mounting coaxially with the drive shaft 2 on which the elevator drive pulley is mounted. The disk means 10,10' has a predetermined mass and is connected to and concentric with the torsion spring means 11,20. The means for mounting the disk means 10,10' and the torsion spring means 11,20 on the end face 6.1 of the free end 6 of the drive shaft 2 includes the threaded bolt 9 extending through a central aperture in the disk means and threadably engaging an aperture formed in the end face of the drive shaft. The nut 12 threadably engages the threaded bolt 9 for retaining the disk means 10,10' on the threaded bolt and a cap 14 covers the nut.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An oscillation damper for an elevator drive pulley comprising:

a disk for mounting coaxially with a drive shaft on which an elevator drive pulley is mounted, said disk having a predetermined mass;

a torsion spring including a plurality of radially extending spokes which function as a torsion spring, each said spoke being a portion of said disk between adjacent recesses formed through said disk, each said recess extending generally circularly over a predetermined arc and having a radially outwardly extending prolongation formed at each end thereof, a portion of said disk remaining between two adjacent prolongations forming one of said spokes; and means for mounting said disk and said torsion spring on an end face of a free end of the drive shaft coaxially with said torsion spring connected between said disk and the drive shaft whereby oscillations present in the drive shaft excite said torsion spring and said disk into oscillation thereby dampening the oscillations in the drive shaft.

2. The oscillation damper according to claim 1 including a trimming ring connected to said disk for fine adjustment of said predetermined mass.

3. An oscillation damper for an elevator drive pulley comprising:

a disk for mounting coaxially with a drive shaft on which an elevator drive pulley is mounted, said disk having a predetermined mass;

a torsion spring connected to and concentric with said disk, said torsion spring having a predetermined fixed spring rate;

means for mounting said disk and said torsion spring on an end face of a free end of the drive shaft coaxially with the drive shaft and with said torsion spring connected between said disk and the drive shaft whereby oscillations present in the drive shaft excite said torsion spring and said disk into oscillation at a predetermined damping frequency thereby damping the oscillations in the drive shaft; and means for adjusting said predetermined mass along an axis of the drive shaft relative to said torsion spring for selectively setting said damping frequency.

4. The oscillation damper according to claim 3 wherein said disk has a plurality of recesses formed therethrough and said torsion spring includes a plurality of radially extending spokes which function as a torsion spring, each said spoke being a portion of said disk between adjacent ones of said recesses formed through said disk.

5. The oscillation damper according to claim 4 wherein each said recess extends generally circularly over a predetermined arc and has a radially outwardly extending prolongation formed at each end thereof, a portion of said disk remaining between two adjacent prolongations forming one of said spokes.

6. The oscillation damper according to claim 5 wherein said predetermined arc is substantially 120°.

7. The oscillation damper according to claim 3 wherein said means for adjusting includes a trimming ring connected to said disk for fine adjustment of said predetermined mass by adding an additional mass thereto spaced axially from said torsion spring.

8. The oscillation damper according to claim 7 including a plurality of threaded apertures formed in said disk and a plurality of screws extending through apertures formed in said trimming ring and engaging said threaded apertures formed in said disk.

9. The oscillation damper according to claim 8 wherein said apertures formed in said trimming ring and said threaded apertures formed in said disk are spaced radially outwardly from said spokes.

10. The oscillation damper according to claim 3 wherein said torsion spring means is a tubular torsion spring, said disk has an aperture formed therein through which said tubular torsion spring extends and said means for adjusting permits axial displacement of said disk relative to said tubular torsion spring.

11. The oscillation damper according to claim 10 wherein said tubular torsion spring includes a tubular spring element having an external thread formed thereon for engaging said disk and permitting said axial displacement of said disk.

12. The oscillation damper according to claim 11 including a clamping nut engaging said external thread for selectively securing said disk relative to said tubular torsion spring.

13. The oscillation damper according to claim 12 including a hood covering said clamping nut.

14. The oscillation damper according to claim 11 wherein said tubular spring element has a radially extending spring foot formed at one end thereof for abutting the end face of the free end of the drive shaft.

15. The oscillation damper according to claim 11 wherein said tubular spring element has at least one longitudinal slot formed through a wall thereof.

16. The oscillation damper according to claim 3 wherein said means for mounting includes a threaded bolt extending through a central aperture in said disk and threadably engaging an aperture formed in the end face of the free end of the drive shaft.

17. The oscillation damper according to claim 16 including nut threadably engaging said threaded bolt for retaining said disk on said threaded bolt and a cap covering said nut.

* * * * *